June 8, 1926.
A. G. REED
1,587,856
MACHINE FOR MAKING CORDAGE ARTICLES OR THE LIKE
Original Filed Jan. 11, 1923
3 Sheets-Sheet 1
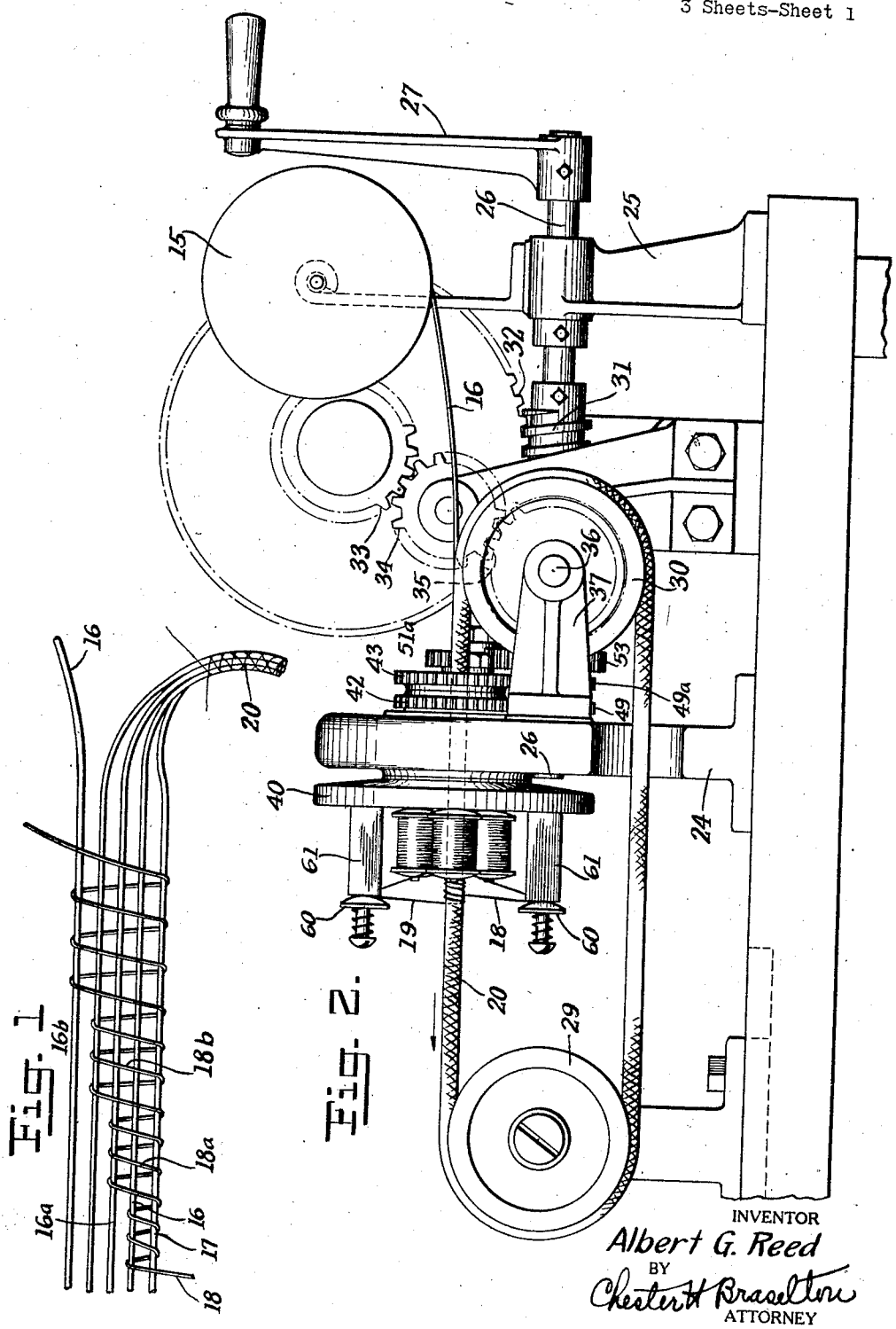
INVENTOR
Albert G. Reed
BY
Chester H Braselton
ATTORNEY June 8, 1926.
A. G. REED
1,587,856
MACHINE FOR MAKING CORDAGE ARTICLES OR THE LIKE
Original Filed Jan. 11, 1923  3 Sheets-Sheet 2
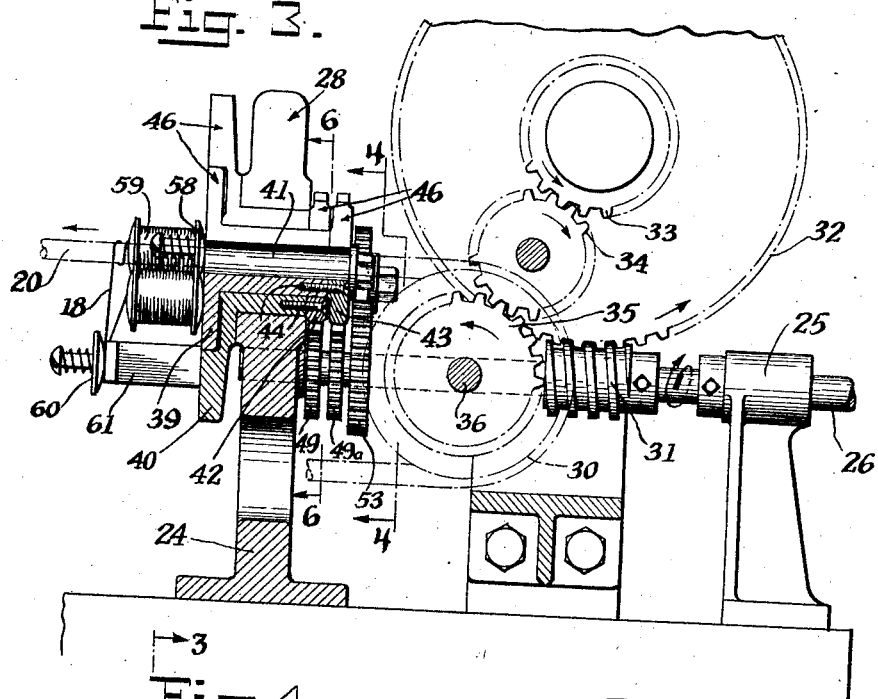
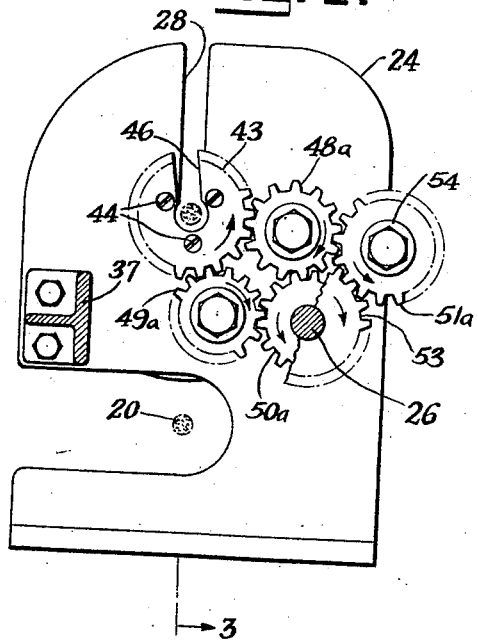
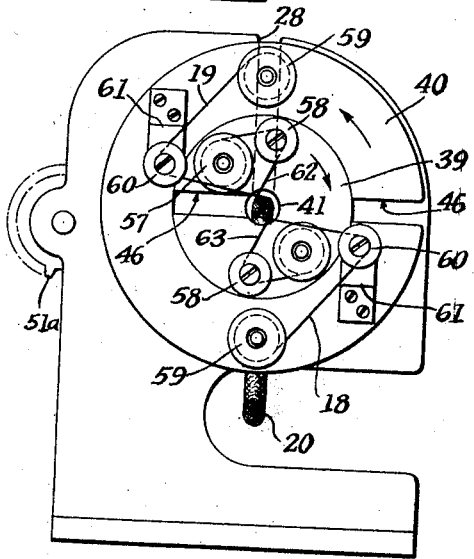
INVENTOR
Albert G. Reed
BY
Chester H. Braselton
ATTORNEY June 8, 1926.  A. G. REED  1,587,856
MACHINE FOR MAKING CORDAGE ARTICLES OR THE LIKE
Original Filed Jan. 11, 1923   3 Sheets-Sheet 3

INVENTOR
Albert G. Reed
BY
Chester H Braselton
ATTORNEY

Patented June 8, 1926.

1,587,856

UNITED STATES PATENT OFFICE.

ALBERT G. REED, OF MIDDLETOWN, CONNECTICUT, ASSIGNOR TO THE RUSSELL MANUFACTURING COMPANY, OF MIDDLETOWN, CONNECTICUT, A CORPORATION OF CONNECTICUT.

MACHINE FOR MAKING CORDAGE ARTICLES OR THE LIKE.

Original application filed January 11, 1923, Serial No. 611,987. Divided and this application filed July 28, 1924. Serial No. 728,526.

This invention relates to a machine adapted to make a cordage or cordage belt like product or the like.

This application is a division of my prior application for endless belt, machine and manufacturing method, Serial No. 611,987, filed January 11th, 1923.

An object of my invention is to provide a machine for producing a cordage structure composed of longitudinal or lengthwise strands or body members of fibrous materials, built up or juxtaposed with one another with binders of thread or other fibrous material simultaneously wound on the strands or body members to form a solid structure of any desired firmness, thickness, length or the like.

A further object is to provide a machine for producing a structure of this general character in which the outer strands may be of a desired increased length over the inner strands to thereby build up a belt like structure in which an even distribution of the strain throughout the cross-section of the structure will be had in use, for example, in passing over a curved pulley, thereby avoiding a greater strain of the outside portion of the cordage or belt, as would otherwise occur.

A further object is to provide a machine for making an endless belt with a body portion fed through the machine, or from a source of supply, and a binder applied thereto simultaneously with the forming of the endless belt.

A further object of the invention is to provide a machine for manufacturing structures of the characteristics indicated, capable of other applications as may appear to those skilled in the art, including means for applying one longitudinal strand or body member of a fibrous material in juxtaposition with respect to another and binding the same one to the other by suitable binders; and also a machine for forming a built up cordage by applying strands, one upon another, which may be fed from the same source and binding each strand in position as the same is applied, the binder threads being thus interlaced or intercrossed.

A further object is to provide a machine of this character in which the tension of the binder may be regulated to thereby produce a harder or softer completed structure as may be desired.

A further object of the invention is to provide a machine for performing the operation of feeding longitudinal body members and applying binder members or sets of binder members wound in opposite directions to further increase the strength, firmness and serviceability of the product.

A still further object is to provide a machine for making a structure of this character in an endless belt by which the several strands are laid substantially parallel to avoid intercrossing of the main body strands which in such structure tends to stretch one strand over the other and weaken the belt in use.

A further object of the present invention is to provide a machine for performing all or any one of the functions herein indicated in which belts or cordages, or various kinds thereof, may be made in various lengths on the same machine.

Various other objects are within the scope of this invention such as relate to the arrangement of the related elements of the structure; to various details of construction; to economies of manufacture; and to each of the other features of novelty as will appear from a consideration of the details of the drawing and related description of certain forms of the invention, one of which may be preferred.

The accompanying drawings illustrate an exemplary embodiment of my invention serving to explain the principles thereof which may be adapted to various modified structures and modes of operation to better suit the needs of manufacturers and users.

Figure 1 illustrates in a diagrammatic way a portion of a completed belt with certain of the binder threads partly unwound to separate the fabricated or laminated lengthwise parallel strand structure, the substantially completed belt being shown in the machine in Figure 2.

Figure 2 shows my improved belt manufacturing machine in side elevation carrying a belt in the course of being built up.

Figure 3 is a sectional view taken on the line 3—3 of Figure 4.

Figure 4 is a section taken on the line 4—4 of Figure 3, indicating the separately operating gear train employed to rotate the two-part winding head in opposite directions, showing the slot through which the belt is removed when completed.

Figure 5 illustrates an end view thereof except that this last view shows the winding or bobbin head in advance operating position with the belt opening closed by the revolving machine parts.

Figure 6:
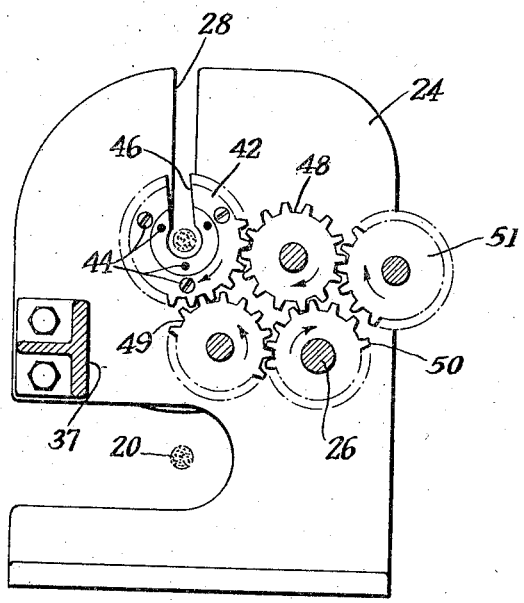
Figure 6 is a section taken on the line 6—6 of Figure 3.

Referring now more particularly to the drawings for a detailed description of the endless belt or cordage making machine made in accordance with my invention, there is shown a feed strand spool 15 carrying enough thread or stranded material to feed the belt making machine; and a strand 16 feeds from the spool and is made in the form of a loop 17 by doubling the strand upon itself a length equal to the required length of the belt to be manufactured, the strands of the loop 17 being tied together by oppositely wound binder threads 18 and 19. This loop 17 is carried on pulleys 29 and 30 of the belt making machine which causes the loop 17 to feed forwardly through the machine, automatically applying the feed cord 16 and binder threads 18 and 19 until a fabricated or laminated belt 20 is completed. A feed strand or lengthwise tension member 16 and a binder or binder threads 18 and 19 are successively fed upon or applied to the structure being built up until the required diametrical size or thickness of belt or cordage structure is secured.

In the diagrammatic view of Figure 1 the belt or finished cordage product is broken apart or loosened up to illustrate the particular manner of building up the product by the successive or alternate application of lengthwise strands and binder threads. It is to be observed that the Figure 1 diagram, for comprehensiveness, illustrates one binder thread as 18 applied in a manner to first wrap one strand 16 upon the first loop 17, when the first loop 17 has been formed from the supply 15 by likewise binding the loop 17 to the beginning of the strand. Another feed strand 16ª is extended or applied parallel to the previously wrapped structure and thereupon the said binder thread wraps or envelopes, as indicated at 18ª, the strand 16ª to tightly bind it in position and to the first bound strands; similarly the binder thread portion 18ᵇ wraps the next lengthwise tension strand 16ᵇ and is continued throughout a successive number of times until the structure embodies a plurality of parallel tension strands 16 tightly bound upon the wrapped structure to produce the final belt or cord 20. The binder threads 18 and 19 are first tied or secured to the innermost strands, 16 and 17, and the said binder threads are given at least one turn or wrap thereabout, whereupon the next strand 16ª, one or more, is placed in position and immediately followed by another reversed and criss-crossed wrapping or turn of the said binder threads; and this method of procedure is pursued by lengthwise strand and spiral thread applications until the product has acquired the desired thickness or diameter.

These binder threads 18—19 and 62—63 are preferably run in pairs, as will be observed in Figure 5; and one set of binder threads is applied slightly ahead of the other pair in such a manner that the result is an oppositely wound criss-crossed and interwound or interlaced fabricated thread structure possessing a final winding of circumferential binder threads. It is to be observed that my belt or cordage product is composed of strands preferably disposed parallel to the line of tension or strain to which the cord is subjected rather than being laid in a plaited, braided, or twisted manner as some types of belts, and my improved belt structure is composed of substantially parallel strands with the plaited or braided structure over a core eliminated which avoids the possibility of angular or crosswise plaited thread portions becoming strained at the cross-overs or straightening out, thus lengthening the belt in case the core breaks.

Furthermore, in addition to the longitudinal strands, I employ only circumferential binder threads so tightly applied that the stretch, if there be any in the lengthwise members, is pressed or forced out ahead of the winding binder threads because of the fact that the rapidly rotating binder threads so compress the strands that they are divided into a plurality of tightly bound short sections the length of which is defined by the distance between the binder thread, the said distance itself being regulated by the pitch or the lead of the binder thread; and therefore the resulting structure consists of a fabricated member bound both lengthwise and spirally, from end to end of the belt and from the inner central strands to the outer strands, and this construction is of such character that strain which might otherwise stretch an unbound member of considerable length fails to do so in this case because of the fact that the strain is so distributed to the many tightly bound sub-divisions throughout the length of the belt that the imposed load or strain does not materially stretch the belt. In other words, the material is so tightly bound that the finished product is very dense and compact in cross section which insures against lengthwise change and makes a serviceable belt.

Referring now more particularly to the details shown in the figures of the drawings for a description of the machine used in the manufacture of the foregoing product, there are shown brackets 24 and 25 carrying a drive shaft 26, and on the outer end thereof a crank 27 or power pulley is fixed by which the machine is driven. A spool 15 is carried on the machine and a strand 16 feeds therefrom to the belt 20 as it is being built up by the machine; and the bracket 24 is slotted, as at 28, through which slot the completed belt is removed.

The machine is provided with an adjustable idle pulley 29 to make various lengths of belts and a belt feed pulley 30 which are spaced apart the distance required to produce a certain length of belt, and the pulley 30 is suitably rotated to move the belt through the machine at the proper speed for the application of the thread binders. The pulley 30 is driven from the main drive shaft 26 through the agency of a worm 31 fixed to the said shaft which drives a worm wheel 32, and this wheel 32 carries a spur gear 33 which drives an idle spur gear 34 which in turn drives a spur gear 35 fixed to the belt drive pulley; and in fact the driven gear 35 and pulley 30 are fixed to a shaft 36 journaled in a bracket 37, the gear train being so arranged as to feed the belt forwardly through the machine winding head.

The inner end of the drive shaft 26 is journaled in the bracket 24 and a train of reverse gears is operated by the shaft to drive my improved two-part winding or bobbin head. The bobbin head consists of two concentrically operated discs, there being a smaller central disc 39 driven in one direction, while an outer disc 40 is driven in the other direction. The two numbers 39 and 40 constitute the winding head or bobbin head and are of hollow construction, thus providing a belt passage 41 through the hub of the concentric discs through which the belt travels. The outer face of the winding discs or heads 39 and 40 is formed flush by setting one disc within the other as shown in the sectional view Figure 3. The outer larger winding disc 40 has its hub journaled in the bracket 24 with the inside hub end anchored to a pinion 42, and this pinion is driven from the shaft 26, as later described. In a similar manner the inner winding disc 39 has its hub journaled within the outer head disc 40 and the inner end of the disc hub 39 is anchored to a drive pinion 43. The drive pinion 43 is driven in a direction reverse to that of the pinion 42 with the result that the two-part bobbin head 39—40 is oppositely rotated about the axis of the belt 20 passing through the opening 41 of the head. Screws 44 are shown in the drawing as securing the two discs 39 and 40 to their respective drive pinions 43 and 42.

The bobbin head 39—40 is made with a slot 46 formed from the rim through the bearing hubs and communicating with the belt passage 41. In a similar manner the two pinions 42 and 43 are also made with slots 46, and the slots in all four parts register one with the other with the slotted bracket at one cycle of operation so that the belt may be removed from the winding head through the slot 28 of the bracket 24, and taken from the machine.

A driving means, such as a gear train, to oppositely rotate the two-part winding and bobbin head will now be explained; and it is already understood how the pinion 42 is fixed to the disc 40. Figure 6 illustrates a gear train engaging and driving the pinion 42, and it is observed that idle gears 48 and 49 mesh with the pinion 42 in such a manner that the pinion is continuously rotated without interruption from its slot 46, for at least one idler is always driving the pinion 42 during the time the said slot 46 is passing over the other idler gear. A third idler spur gear 50 is free on the shaft 26 and meshes with the two idlers 48 and 49. A drive gear 51 engages one of the idlers as, for example, 48, for the purpose of driving, through the three gears 48, 50 and 49, the said pinion 42. Still further observing Figure 6, it is to be noted that the main drive shaft 26 does not drive the gear 50, for this gear is an idler driven indirectly from the main driving gear 51; and the means by which the main gear 51 is driven will be observed from the other views.

Referring now to Figure 4 for first, a description of how the gear 51 (Figure 6) is driven, and second, how the pinion 43 is driven, it is observed that a main drive shaft gear 53 is fixed on the shaft 26 meshing with a gear 51$^a$ by which the gear 51 is driven. In fact, the gear 51$^a$ is a companion to gear 51, both being fixed on a common hub 54 and disposed in different planes in order that the gear 51 be driven from the shaft 26, thus revolving the outer bobbin head part 40, as already explained. As to this gear train which drives the outer bobbin head 40, reference is again made to Figure 4 where a gear 50$^a$ is fixed to the shaft 26 and engages with two idlers 48$^a$ and 49$^a$, which idlers in turn mesh with the pinion 43, thereby driving the inner bobbin head 39. The companion gears 50 and 50$^a$ drive respectively the two sets of idlers which in turn drive pinions 42 and 43. Thus, by turning the crank 27, or by driving the shaft 26, the two bobbin head parts 39 and 40 are driven in opposite directions simultaneously with the rotation of the belt feed pulley 30.

A description will now be given of the thread bobbins, a plurality of which are used, to feed binder threads circumferentially around the belt or cord being built up.

A plurality of thread bobbins is mounted upon each winding head; and in the present case a pair of bobbin spools 57 is mounted on the inner disc 39 together with a pair of tension members 58. Similarly, a pair of bobbin spools 59, together with a pair of tension members 60, is mounted on the outer disc 40. The said bobbin spools and tension members rotate with their respective discs, and the tension members are so positioned that four threads are evenly guided without interference onto the belt moving through the passage 41. Preferably the outer tension members 60 are mounted upon long brackets 61 and are spaced from the face of the outer disc 40 in order that the pair of binder threads 18 and 19 be wound in one direction around the belt and the binder threads 62 and 63 be wound in the other direction around the belt 20 without interference one from the other. The tension members are of well known construction preferably employing an adjustable compression spring which enables the machine operator to vary the tension of the binder threads as they are being wound around the belt; and by adjusting the tensions to a substantially tight degree, the resulting structure is one of a hard and resisting character possessing tightly wound and densely compact belt strands, which produces a serviceable belt.

In the operation of my improved belt making machine, enough strand material 16 is unwound from the spool 15 to first form a loop 17 over the spaced pulleys 29 and 30, and the winding of binder threads is begun at the tied end and continued throughout the length of the belt followed by the successive application of another layer of binder threads each time another strand of lengthwise material is applied. Rotating the shaft 26, as heretofore described, drives the belt 20 through the machine in the direction of the arrow, and at the same time revolves in opposite direction the two-part winding head around the belt thereby applying one set of binders 18—19 and the other pair of binders 62—63. The principle of my invention enables any number of binders to be applied, and for the present disclosure I have illustrated the two pairs of double parallel binders running in opposite directions. When the belt structure attains the desired size, the feed strand 16 is cut and the end thereof run through the winding bobbin head until the raw end is firmly bound down to the belt body. The belt is removed from the machine by stopping the winding head at the position shown in Figure 2 in order that the slots formed through all the rotating parts be registered, thereby affording an opening from the belt passage 41 outwardly through the machine.

The method of building up the belt and the operation of the machine is such that the successively applied longitudinal strands are laid one upon the other substantially as shown in Figure 1 so that each successive strand is applied on the outer circumference or outer belt line with the result that the outer belt portions are longer than the inner belt portions by the difference in the circumference of the outer and inner belt circle. This construction equalizes the load carried by the belt because the inside strands as well as the outside strands are under equal tension and do equal work, and this is one of the particulars, among others, which distinguishes and improves my belt over others for, in leather belts, and in braided and plaited material, the inside belt line and portion does not carry an equal part of the load along with the outside thereof, due to the fact that the outside and inside are about equal in length and when coiled into belt form the inner circumferential portion is under compression and the outer portion is under tension. My belt overcomes the above mentioned objections and produces a belt not susceptible to stretching.

Having thus described my invention and what I desire to secure by United States Letters Patent and claim, is:

1. A belt making machine comprising a pair of interfitting oppositely running discs forming a winding head, hubs made on the discs and concentrically journaled one within the other and provided with a belt passage, a pinion fixed to each hub, the aforesaid parts provided with a slotted opening connecting with the belt passage, and a transmission driving the pinions in opposite directions.

2. A belt making machine comprising a pair of interfitting, oppositely running discs forming a winding head, a plurality of oppositely running bobbin thread carriers, hubs made on the discs and concentrically journaled one within the other and provided with a belt passage, a pinion fixed to each hub, the aforesaid parts provided with a slotted opening connecting with the belt passage, and a transmission driving the pinions in opposite directions.

3. A belt making machine comprising a pair of interfitting, oppositely running discs forming a winding head, a plurality of oppositively running bobbin thread carriers, hubs made on the discs and concentrically journaled one within the other and provided with a belt passage, a pinion fixed to each hub, the aforesaid parts provided with a slotted opening connecting with the belt passage, a transmission driving the pinions in opposite directions and a belt carrier establishing a belt length and driven from the drive transmission.

4. A belt and cord making machine comprising a central winding disc having a belt feed passage, a pair of thread bobbins carried on the disc and adapted to apply binder threads to the cord feeding through the disc, an outer winding disc, a pair of bobbins similarly carried thereon, tension members mounted on each disc, each disc made with registering slots for the removal of an endless belt or cord from the machine.

5. A belt and cord making machine comprising a journal bracket made with a belt removable slot, a central winding disc having a belt feed passage, a pair of thread bobbins carried on the disc and adapted to apply binder threads to the cord feeding through the disc, an outer winding disc, a pair of bobbins similarly carried thereon, tension members mounted on each disc, each disc made with registering slots for the removal of an endless belt or cord from the machine and registering with the journal bracket slot.

6. A belt and cord making machine comprising a journal bracket, concentric hub journals mounted therein, drive pinions fixed to each hub, a winding head carried upon each hub, thread bobbins on the heads, and transmission means to drive the pinions.

7. A belt and cord making machine comprising a journal bracket, concentric hub journals mounted therein, drive pinions fixed to each hub, a winding head carried upon each hub, thread bobbins on the heads, transmission means to drive the pinions, and a feed means to supply belt making material.

8. A belt and cord making machine comprising a journal bracket, concentric hub journals mounted therein, drive pinions fixed to each hub, a winding head carried upon each hub, thread bobbins on the head, transmission means to drive the pinions, a feed means to supply belt making material, and a belt feeding means to move the belt through the machine as it is built up.

In testimony whereof, I affix my signature.

ALBERT G. REED.